United States Patent [19]

Cruz

[11] 4,379,234
[45] Apr. 5, 1983

[54] ELECTRO OPTIC CONTROLLED PISTON RING INSTALLING APPARATUS

[75] Inventor: Jose C. Cruz, Columbus, Ind.

[73] Assignee: Cummins Engine Company, Inc., Columbus, Ind.

[21] Appl. No.: 264,046

[22] Filed: May 15, 1981

[51] Int. Cl.³ .............................................. G02B 5/14
[52] U.S. Cl. ..................................... 250/561; 29/222; 29/707; 29/720
[58] Field of Search .................. 250/561, 227; 29/706, 29/707, 720, 222

[56] References Cited

U.S. PATENT DOCUMENTS

| | | |
|---|---|---|
| 2,629,936 | 3/1953 | Cronstedt . |
| 3,104,594 | 9/1963 | Reiners . |
| 3,571,898 | 3/1971 | Fuhrmann . |
| 3,622,396 | 11/1971 | Fernandez . |
| 3,757,944 | 9/1973 | Goodman . |
| 3,993,899 | 11/1976 | Chapman . |
| 4,047,276 | 9/1977 | Albers . |
| 4,236,070 | 11/1980 | Lee . |

*Primary Examiner*—David C. Nelms
*Assistant Examiner*—Darwin R. Hostetter

*Attorney, Agent, or Firm*—Sixbey, Friedman & Leedom

[57] ABSTRACT

Apparatus for installing a set of dissimilar piston rings (12,14,20,38) which must be arranged in proper predetermined order and orientation in an internal combustion engine piston. The apparatus includes a ring supporting element 48 for retaining the set of piston rings in the order in which they will be installed, order sensing means (115,136,138) for producing an electrical disabling signal if a corresponding ring is not in a predetermined sequential order and a plurality of orientation sensing means (140,142) for producing an electrical disabling signal if a corresponding piston ring is not in its proper orientation. Expanding means (60) responsive to a control means (174) operates to expand the set of rings to allow coaxial insertion of a piston and subsequently to relax the rings into corresponding grooves of the piston as long as a disabling signal has not been generated by the corresponding sensing means (115,136,138,140,142). Each sensing means has an electro-optic device including an optic fiber cable (86,88,90,96) extending between a corresponding piston ring and sensor means circuit (122,124,126,128,130,132,134).

13 Claims, 10 Drawing Figures

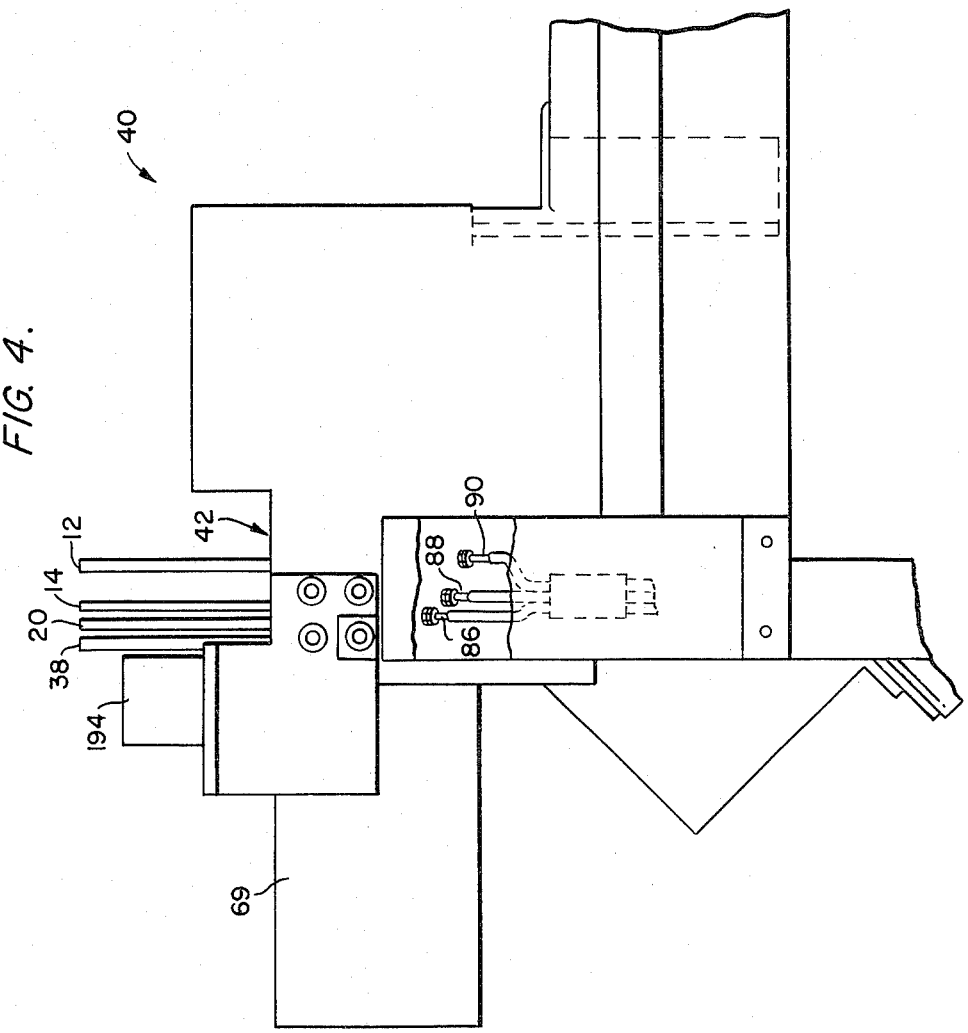
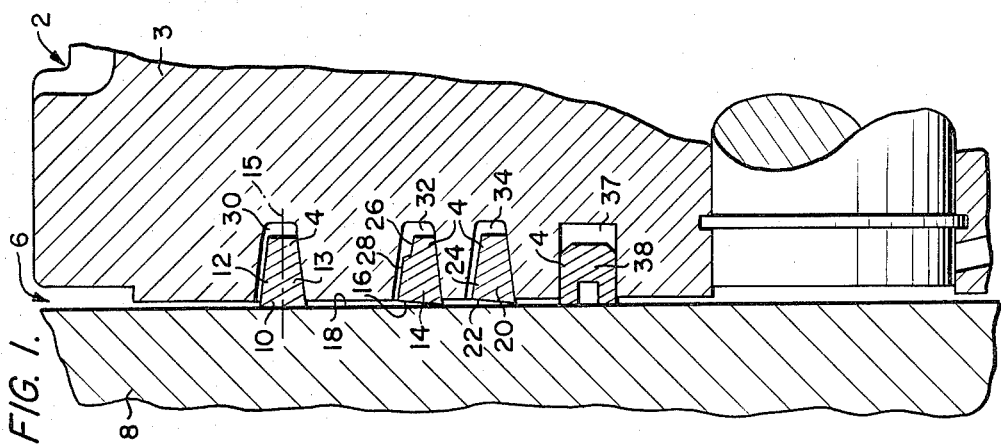

ELECTRO OPTIC CONTROLLED PISTON RING INSTALLING APPARATUS

DESCRIPTION

1. Technical Field

This invention relates to apparatus for insuring that the components of an article of manufacture, such as the rings of a piston assembly, are properly ordered and oriented when assembled.

2. Background Art

Certain types of piston assemblies employ compression rings having slightly different shapes which require the rings to be assembled in a predetermined orientation and sequence within the corresponding grooves of the piston. For example, U.S. Pat. No. 3,104,594 discloses a piston construction employing piston rings which are axially non-symmetrical, that is, the upper half of each ring is not the mirror image of the lower half. In particular, the ring design disclosed in the '594 patent includes an outer peripheral face on the ring which is inclined to the wall of the cylinder so that the cylinder wall is engaged only along the lower edge of the ring. A ring of this type will not operate as intended if the ring is installed in reverse (upside down) orientation.

In other known types of plural piston ring arrangements, each ring of a set designed for a single piston is unique in shape and/or material composition from the remaining rings of the set. For example, the assignee of this invention currently manufactures an internal combustion engine piston assembly including a set of three rings having distinct functional purposes wherein the top ring is axially symmetrical and is formed from a first material and the lower two rings are distinctly shaped, axially non-symmetrical and formed of a material which is dissimilar from the material of the top ring. Despite these differences, the overall dimensions of these rings are sufficiently similar to allow the rings to be interchanged or reversed improperly upon installation in the grooves of a piston. Whether reversed or out of order, the results of improper installation can be serious, such as excessive oil consumption, premature ring failure and/or loss of engine efficiency. The cost of replacing improperly installed piston rings can be quite enormous for either the engine manufacturer, if the engine is under warranty, or for the purchaser if the mistake is discovered only after expiration of the warranty.

Since the non-symmetrical shape of some rings is not easily determined by quick visual inspection, piston rings are normally marked when manufactured to provide a visual indication of the top side. However, errors in marking and/or operator inattention during assembly can occur with sufficient frequency to warrant preventive measures. Attempts have been made to automate piston ring installation as is disclosed in U.S. Pat. No. 4,047,276. This type of assembly apparatus employs successive installation stations for dispensing rings individually from a separate stack of rings located at each station. Since no operator participation is normally required during the installation step, proper mounting of each ring in its corresponding piston groove would depend on the individual rings being placed in the correct stack and in the proper orientation within the stack. Obviously, the chance for error would still exist particularly if the ring is improperly marked at the time of manufacture.

Use of optical testing and inspecting apparatus for various manufacturing and apparatus control is well known. For example, U.S. Pat. No. 2,629,936 discloses an optical system for determining locating points on a workpiece and U.S. Pat. No. 3,757,944 discloses an optical device for verifying the position of coded items. However, neither of these disclosures suggests means for checking improper order and/or orientation of a plurality of dissimilarly shaped components designed for assembly into an article of manufacture.

U.S. Pat. Nos. 4,236,070 and 3,993,899 disclose that the use of optical fibers to direct light to and from a reflective surface to test the position of a component is known. However, neither of these references suggests how such structure could be utilized to check the position and orientation of distinct components being assembled in an article of manufacture.

In short, the prior art is devoid of any suggestion of how to detect and/or correct improper ordering and or orientation of similar components of an article of manufacture wherein the components have only subtle but functionally significant structural differences.

Disclosure of the Invention

It is a basic object of this invention to overcome the deficiencies of the prior art as indicated above by providing apparatus for assembling and inspecting an article of manufacture formed by interconnecting a set of components which must be arranged in a predetermined order or orientation in such a manner as to detect and/or prevent improper ordering and/or orientation of the components.

One specific object of the subject invention is to provide apparatus for assembling an article of manufacture formed by interconnecting a set of components which must be arranged in a predetermined order or orientation having assembly means for operating in successive cycles including a holding cycle in which a set of components is retained in an order or orientation in which the set will subsequently be interconnected and an assembling cycle in which all of the components are interconnected in the order and orientation to which the components were held during the immediately preceding holding cycle. Detection means are included for sensing the order or orientation in which the assembly means retains the set of components and control means are included for preventing the assembly means from operating in the assembly cycle if the detection means senses that the set of components is not retained in the proper predetermined order or orientation during a preceding holding cycle.

A particular object of one embodiment of this invention is to provide apparatus for installing a set of dissimilar piston rings which must be arranged in a proper predetermined order or orientation in a plurality of corresponding grooves contained in the exterior surface of a piston, including detection means for sensing the order or orientation of the set of piston rings during a holding cycle prior to the rings being installed in the piston.

In one specific embodiment, electro-optic means are designed to respond to position differences in optical identifying markings placed upon each of the piston rings. In another specific embodiment, electro-optic means are designed to respond to color differences in the optical identifying markings placed on each of the piston rings being installed.

It is a still more specific object of this invention to provide piston ring installing apparatus including ring supporting means for supporting a set of rings in relatively fixed coaxial positions in which the rings are axially spaced in accordance with the corresponding ring receiving grooves of a piston and in which the rings may be expanded to allow the piston to be moved axially through the expanded rings to cause the corresponding ring receiving grooves of the piston to align radially with the corresponding expanded piston rings. The detection means operates to permit relaxation of the rings into the corresponding grooves of a piston only so long as no piston ring is detected which is improperly ordered and/or oriented.

Yet another specific object of this invention is to provide a piston ring installing means including expanding means havig a pair of pivoted jaws for engaging, respectively, the split ends of each piston ring and for moving between a first position in which the rings are relaxed to a second position in which the rings are expanded sufficiently to permit coaxial movement of the piston therethrough. First stop means may be provided for defining the location of one of the jaws when moved to the second position to locate properly the piston rings for inspection by the detection means. A second stop means may be provided for defining the position of the other jaw when moved to the second position to limit the maximum possible expansion of the piston rings.

Other more specific objects of this invention may become apparent from the following summary of the drawings and detailed description of the preferred embodiments.

BRIEF DESCRIPTION OF THE DRAWINGS

FIG. 1 is a fragmentary cross-section view of an engine cylinder block and piston in which a set of dissimilar piston rings have been installed in circumferential grooves formed in the exterior surface of the piston;

FIG. 4 is a side elevational view of the piston ring installation apparatus of FIGS. 2 and 3;

BEST MODE FOR CARRYING OUT THE INVENTION

Figure 2:
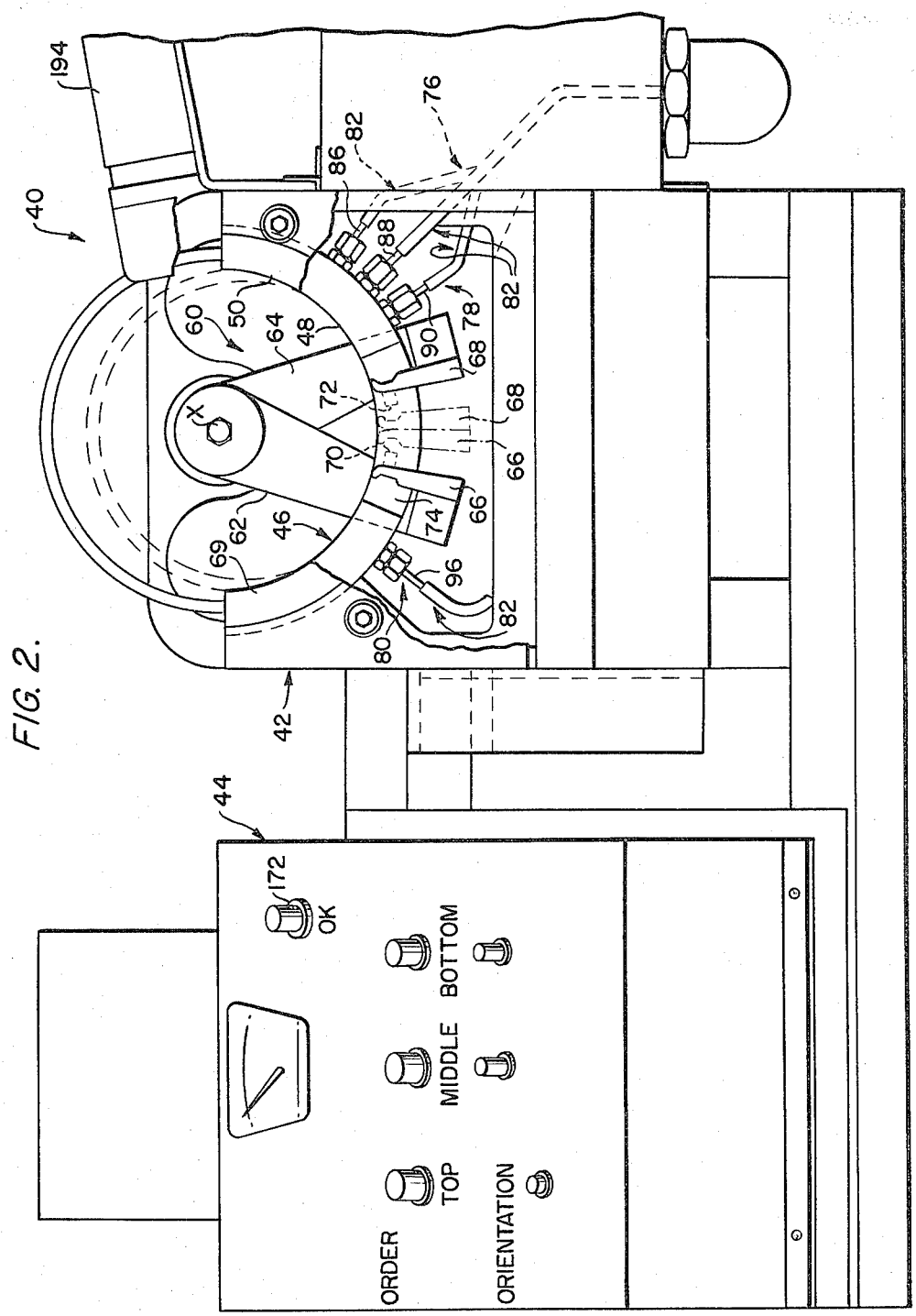
FIG. 2 is a front elevational view of a piston ring installation apparatus designed in accordance with the subject invention.

In order to understand the subject invention, it must be noted that a variety of manufacturing processes involve the assembly of an article formed by interconnecting a set of components which must be arranged in a predetermined order and/or orientation. One example of this type of article is the piston assembly of an internal combustion engine which includes a set of dissimilar piston rings which must be installed in a proper order within corresponding grooves formed in the exterior cylindrical wall of a piston. Some piston rings are axially non-symmetrical which means that the upper half is not the mirror image of the lower half of the piston. Rings of this type must be installed with the proper half oriented upwardly in order to function in the manner desired.

FIG. 1 is a fragmentary cross-sectional view of a piston assembly including a set of dissimilar piston rings 4 installed in a piston 3 for use within a cylinder bore 6 contained in the engine block 8 of an internal combustion engine (not illustrated). The set of piston rings 4 disclosed in FIG. 1 includes a top ring 10 formed of a first type of material capable of withstanding the higher temperature to which the top ring is exposed during normal engine operation. While top ring 10 is axially symmetrical (i.e., the top half 12 is the mirror image of the bottom half 13 located below the plane represented by line 15) middle ring 14 is clearly not axially symmetrical. In particular, middle ring 14 has an outer peripheral face 16 which is inclined upwardly from the wall 18 of the cylinder bore 6. The purpose for this configuration of the outer peripheral wall is to achieve better compression gas sealing characteristics and is described and explained in much greater detail in U.S. Pat. No. 3,104,594 assigned to the same assignee as the subject invention.

Bottom ring 20 contains an outer peripheral wall 22 which is inclined relative to the wall 18 of cylinder bore 6 in the same manner as middle ring 14. However, the upper surface 24 of bottom ring member 20 has an inverted frusto-conical configuration. In contrast to this configuration, middle ring 14 contains an inner recess 26 formed in the corresponding inverted frusto-conical upper 28. For reasons which are not critical to an understanding of the subject invention, recess 26 improves the performance of middle ring 14 and yet is not found to be necessary to the performance of bottom ring 20.

The circumferential grooves 30, 32 and 34 formed to receive upper piston ring 10, middle piston ring 14, bottom ring 20, respectively, are all formed in generally the same shape and dimensions. It is thus possible to place any one of the rings 10, 14 or 20 in any one of the grooves 30, 32 or 34. It is also possible to install any one of the rings 10, 14 or 20 in an inverted orientation. Inversion of ring 10 has no effect on its operation. However, inversion of either ring 14 or ring 20 can have serious deleterious effect on the proper functioning thereof. The last ring making up the set of rings is an oil ring 36 received in groove 37 and is sufficiently different in size and shape to prevent it from being improperly installed in one of the grooves 30, 32 or 34.

The improper installation of any one or more of the piston rings 10, 14 or 20 described above by interchange with one of the other rings or by inversion thereof can result in an extremely expensive premature failure of the piston assembly 2. In particular, improperly installed piston rings can result in loss of compression, engine inefficiency, increased oil consumption, cylinder wall scoring and other serious operational defects. The electro-optically controlled piston ring installation apparatus designed in accordance with the subject invention and illustrated in FIGS. 2-8 is designed specifically to prevent such improper installation.

Figure 3:
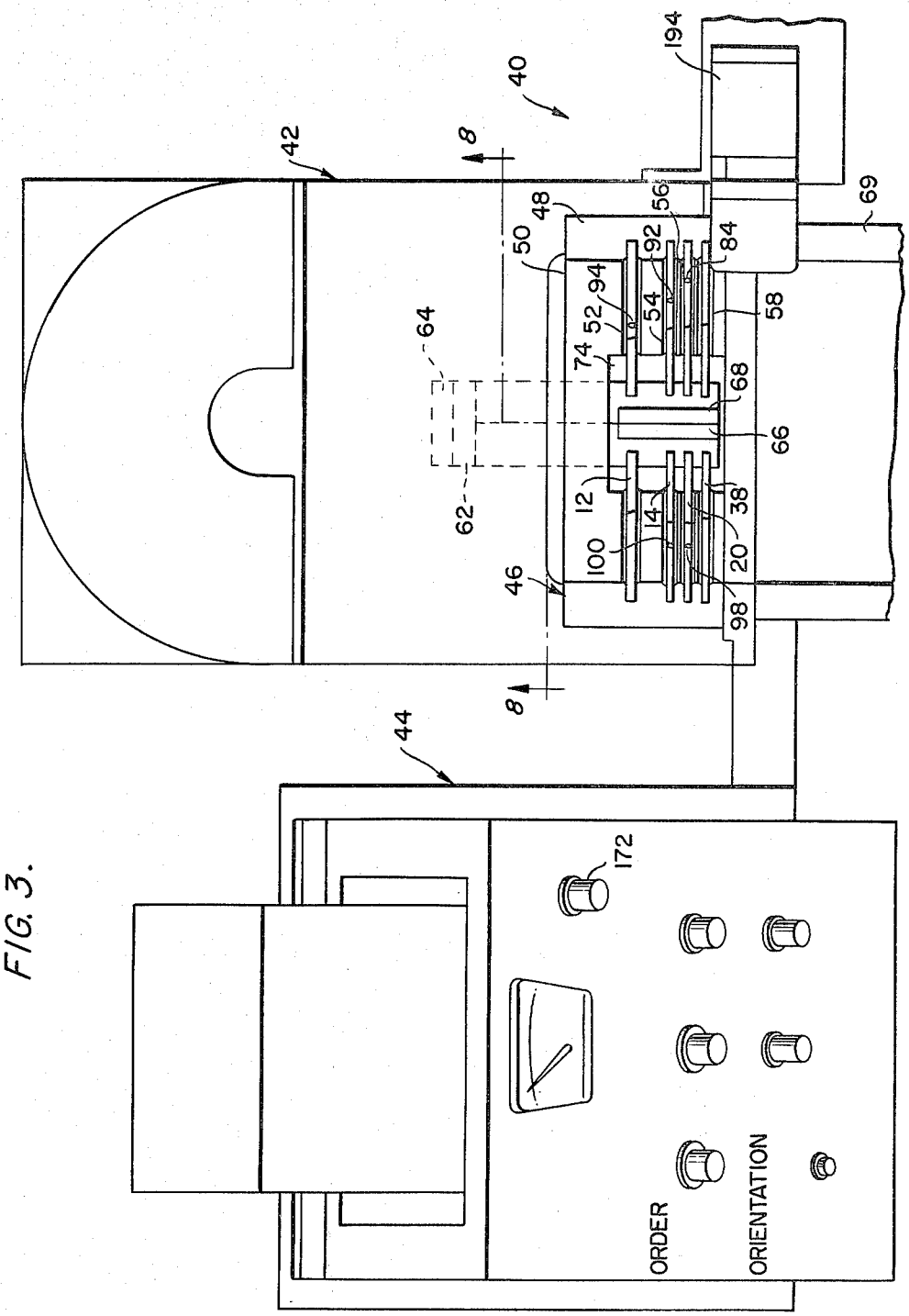
FIG. 3 is a top elevational view of the piston ring installation apparatus of FIG. 2.

Referring now to FIGS. 2-4, a piston ring installation apparatus 40 designed in accordance with the subject invention is disclosed. In particular, apparatus 40 is designed for installing the set of dissimilar piston rings including top ring 10, middle ring 14, bottom ring 20 and oil ring 38 illustrated in FIG. 1. The installation apparatus illustrated in FIGS. 2-4 includes a ring assembly means 42 and control means 44 adapted to control the operation of the ring assembly means. As will be described in greater detail hereinbelow, the ring assembly means 42 operates in successive cycles including a holding cycle in which the set of piston rings are retained in the order and orientation in which the set will be installed and an assembling cycle in which the set of piston rings are installed in the grooves of a piston in the order and orientation in which the piston rings were retained during the immediately preceding holding cycle. The ring assembly means 42 includes a ring supporting means 46 defined by a semi-cylindrical ring supporting element 48 having an interior semi-cylindrical surface 50 containing arcuate grooves 52, 54, 56 and 58 for retaining piston rings 12, 14, 20 and 38, respectively, in generally fixed coaxial positions corresponding to the ring receiving grooves of a piston such as grooves 30, 32, 34 and 37 illustrated in FIG. 1. Thus, the ring supporting means 46 operates to support a set of rings and relatively fixed coaxial positions in which the rings are axially spaced in accordance with the corresponding ring receiving grooves of a piston and in which the rings may be expanded to allow the piston to be moved axially through the expanded rings thereby aligning the ring receiving grooves of the piston with corresponding expanding piston rings.

Rings 12, 14, 20 and 38 (shown in fragmentary form in FIG. 3) are split at one point around the circumference thereof to allow the rings to be circumferentially expanded as referred to above. This expansion is accomplished by expanding means 60 (FIG. 2) for engaging the split ends of each piston ring and for expanding the rings by separating the split ends sufficiently to allow a piston to pass through the coaxially positioned and expanded rings. Expanded means 60 is further designed to relax the rings while they are being guided radially inwardly by the ring supporting means 46 to cause the rings to be installed in the corresponding grooves of the piston.

Expanding means 60 includes a pair of pivoted jaws 62 and 64 arranged to pivot about a common axis coincident with the axis of semi-cylindrical surface 50. Connected with the radial extremity of the pivoted jaws 62 and 64 are axially extending ring end engaging members 66 and 68, respectively. Although not illustrated in FIG. 2, pivoted jaws 62 and 64 are positioned axially beyond ring supporting element 48 in order to permit a piston to be inserted within the set of expanded piston rings. Prior to insertion, a piston may be placed on a semi-cylindrical piston element 69. End engaging members 66 and 68 are initially positioned adjacent one another (see dashed lines in FIGS. 2) to allow the ends 70, 72 (illustrated in dashed lines) of a relaxed piston ring to clear the end engaging portions of members 66 and 68 when the ring is inserted in a corresponding groove contained in surface 50 of ring supporting means 46. As best illustrated in FIG. 3, ring supporting element 48 includes a window 74 in which the end engaging portions of elements 66 and 68 are positioned for arcuate movement between a first position (illustrated in FIG. 3) in which the rings may be installed or removed in corresponding grooves in relaxed condition to a second position (illustrated in solid lines in FIG. 2) in which the rings are expanded sufficiently to permit coaxial movement of a piston (not illustrated) through the rings. As is evident from FIG. 2, when in the expanded condition, the rings have a sufficient radial extent to permit a piston to be inserted therethrough.

As will be explained in further detail hereinbelow, the piston installation apparatus 40 of FIGS. 2-4 includes detection means 76 (only partially illustrated) for sensing the order or orientation in which the ring supporting means 46 retains a set of piston rings during a holding cycle and for generating a stop signal if the rings are not in proper order or orientation. The detection means includes plural order sensing means 78 corresponding in number to the number of piston rings in each set. Each order sensing means 78 produces an electrical disabling signal if the corresponding ring is not in its proper predetermined sequential order. Similarly, the detection means 76 may include plural orientation sensing means 80 corresponding in number to the number of piston rings capable of being reversed in orientation. For example, two are required for the piston ring set designed to be installed by the assembly 40 illustrated in FIGS. 2-4. Each orientation sensing means 80 also produces an electrical disabling signal if the corresponding piston ring is not in its proper orientation. Each of the order sensing means 78 and orientation sensing means 80 includes an electro-optic means 82 (only partially illustrated in FIGS. 2-4) for responding to an optical property of the corresponding ring to produce the disabling signal described above.

As will be explained in greater detail hereinbelow, each electro-optic means 82 includes a optic fiber cable extending between a light source, a photodetector and a corresponding predetermined position adjacent a corresponding piston ring. In particular, one end 84 (FIG. 3) of a optic fiber cable 86 (FIG. 2) terminates at a predetermined circumferential position in groove 56. The remaining two optic fiber cables 88 and 90 (FIG. 2) of order sensing means 78 have ends 92 and 94 which also terminate in predetermined locations within corresponding grooves 54 and 52 of ring supporting element 48 designed to receive rings 14 and 12, respectively. By this arrangement, optical identifying markings may be placed at predetermined circumferential locations on the peripheral face of each of the top three rings making up a set of piston rings in a manner to uniquely identify the ring as being a top, middle or bottom ring. Should a top ring be interchanged with a middle or bottom ring, it is apparent that the identifying markings placed in a corresponding position would not align properly with the optic fiber cable ends positioned in the corresponding grooves of ring supporting element 48.

Order sensing means 78 could serve both to detect proper order and to detect orientation since the inversion of any one of the rings to an improper orientation would result in the identifying marking being located on the left rather than the right of the ring installation apparatus 40 illustrated in FIGS. 2 and 3. However, piston ring manufacturers have found it difficult to insure that the identifying markings will always be placed on the right rather than the left portion of the corresponding rings. Accordingly, the orientation sensing means 80 have been provided for purposes of sensing an inherent optical characteristic of the middle and bottom rings to insure that they have been properly oriented within the corresponding grooves of ring supporting element 48. In particular, each orientation sensing means includes an optic fiber cable 96 (only one is illustrated in FIG. 2) having end 98 and 100 (FIG. 3) positioned within grooves 56 and 54, respectively, of ring supporting element 48 designed to receive rings 20 and 14, respectively.

Figure 5:
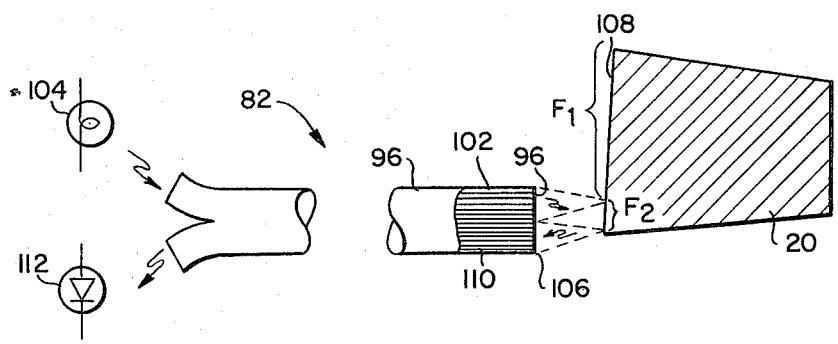
FIG. 5 is a schematic illustration of an electrooptic means designed in accordance with the subject invention for detecting the orientation of a single piston ring.

To understand more clearly how the orientation sensing means operates, reference is made to FIG. 5 in which an electro-optic means 82 including optic fiber cable 96 is illustrated in schematic diagram form. Cable 96 includes essentially a first optic fiber 102 extending between a light source 104 and a desired position 106 adjacent the lower edge of bottom ring 20. During the manufacturing process, the peripheral face 108 of both the bottom ring 20 and middle ring 14 are provided with an upper axial portion $F_1$ which is essentially light absorbing. The remaining lower axial portion $F_2$ is light reflective. By choosing location 106 properly and forming the end 98 of optic fiber cable 96 so as to cause the light carried through first optic fiber 102 to be directed toward the portion $F_2$ of the peripheral face 108 of ring 20, it is possible to detect the orientation of ring 20 by determining whether sufficient light has been reflected from the peripheral face 108. This determination is made by means of a second optic fiber 110 extending between location 106 and a photodetector 112.

The order sensing means 78 of FIGS. 2–4 may similarly include electro-optic means. However, the electronic detection circuitry, connected with each corresponding photodetector and described in greater detail hereinbelow, will be adjusted to cause the output signal to be indicative of the presence or absence of an appropriate optical identifying marking contained on the peripheral face of the piston ring being sensed. As will also be described in greater detail hereinbelow, the respective ring may be differentiated by placing the optical identifying marking at a different circumferential position or by placing markings differentiated in another manner, such as by color, on corresponding rings in each set.

Figure 6B:
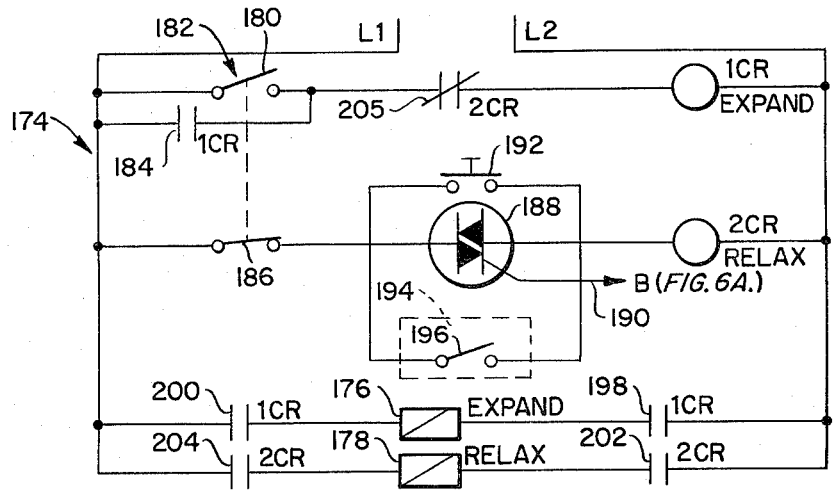
FIG. 6B is a circuit diagram of the control means designed in accordance with the subject invention for receiving a stop signal from the detection means of FIG. 6A and for generating a control signal for operating the piston installation apparatus of FIGS. 2-4.
Figure 6C:
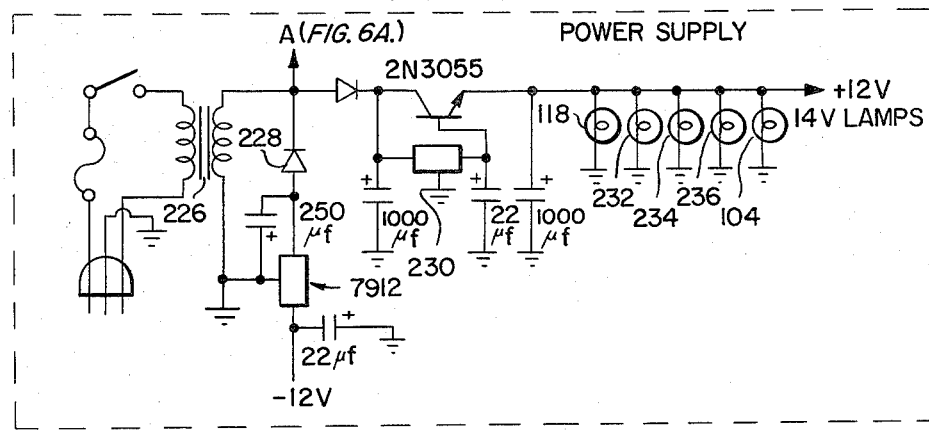
FIG. 6C discloses a power supply circuit for providing power to the detection means and control means of FIGS. 6A and 6B, respectively.
Figure 6A:
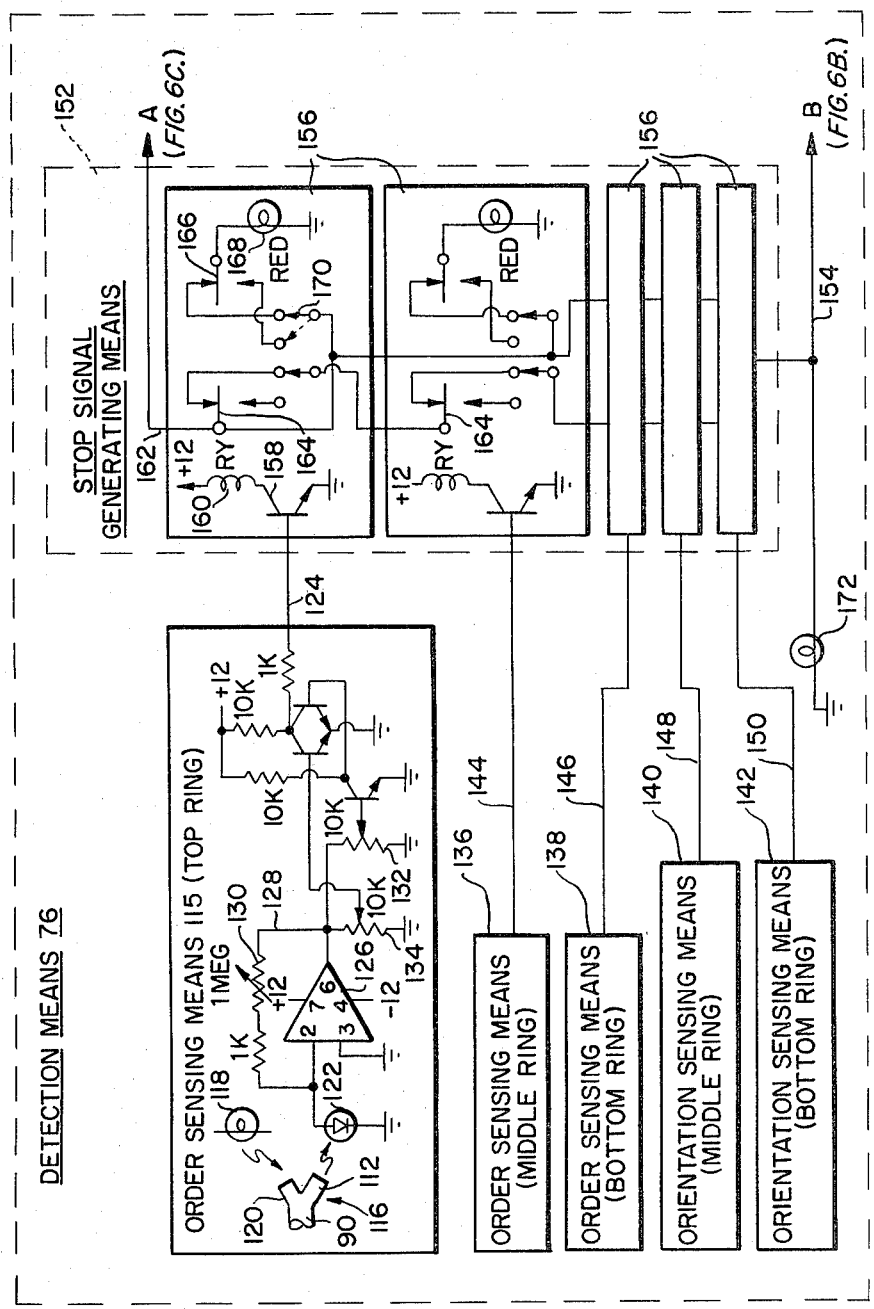
FIG. 6A is an electrical circuit diagram of the detection means for sensing the order and/or orientation of each ring in a set of piston rings.

Referring now to FIG. 6A, the detection means 76 is schematically illustrated as including plural order sensing means 78 and plural orientation sensing means 80 corresponding to those illustrated in FIGS. 2–4. In particular, the top ring order sensing means 115 includes the electro-optic means 116 similar to the structure illustrated in FIG. 5 including a light source 118, an optic fiber cable 90 having a first optic fiber 120 extending between light source 118 and cable end 94 (FIG. 3) for directing light to a predetermined location on the circumference of an expanded top ring and a second optic fiber 112 extending between the same end 94 and a photodetector 122.

Photodetector 122 may be a photo diode whose resistance drops significantly upon being illuminated. The electrical characteristic of photo diode 122 forms an input signal for an electrical circuit designed to generate an electrical disabling signal on output line 124 if the top piston ring is not determined to be in its proper position. Photodetector 122 is connected to one input of an operational amplifier 126, the output of which is connected to a transistorized threshold switching circuit. Operational amplifier 126 is provided with a feedback loop 128 containing a variable resistor 130 for controlling the sensitivity of the order sensing means 115. The actual threshold of the output switching circuit may be controlled by a variable resistor. In the particular circuit illustrated in FIG. 6A, a pair of variable resistors 132 and 134 are employed to permit the order sensing means 115 to be adjusted to respond to reflected colors. Thus the order sensing means of FIG. 6A could be adjusted to respond either to position or to the color of the optical identifying markings contained on the ring inserted in groove 52 of ring supporting element 48. Circuitry identical to that of order sensing means 115 is used in the middle ring order sensing means 136 for verifying that an appropriately marked middle ring has been placed in groove 54 of ring supporting element 48. Similarly, order sensing means 138 detects whether a bottom ring has been placed in the corresponding groove of ring supporting element 48 and includes circuitry identical to that of order sensing means 115. Orientation sensing means 140 and 142 have circuitry which is also identical to that of order sensing means 115, but the threshold adjustment is set differently so as to differentiate between the reflective and non-reflective portions of the peripheral face of the middle and bottom rings. If an improperly positioned ring is detected by order sensing means 115, 136 or 138, or an improperly oriented ring is sensed by orientation sensing means 140 or 142, a disabling signal will appear on corresponding output lines 124, 144, 146, 148 or 150.

Detection means 76 further includes a stop signal generating means 152 for generating a stop signal if the rings are not in proper order and/or orientation. The stop signal operates to prevent the ring assembly means 42 from operating in the assembly cycle to thereby relax an expanded set of piston rings for installation in corresponding grooves of the piston. Stop signal generating means 152 may receive a disabling signal from any one of the order sensing means through output lines 124, 144, 146, 148 or 150 to produce a stop signal on output line 154. In particular, stop signal generating means includes plural transistor controlled solenoid switches 156 corresponding in number to the number of sensing means in the detection means 76.

Each transistor control solenoid switch 156 includes an input transistor 158 for energizing a solenoid coil 160 in response to the receipt of a disabling signal on the corresponding output line of a sensing means circuit. Each switch 156 is connected in series between a source of input current 162 and the output line 154 such that upon energization of any one of the coils 160, a series connected contact 164 will be opened to break the current path between source 162 and output 154. Simultaneous with the opening of contact 164, a separate switch contact 166 will be opened to deenergize an indicator light 168. A manually controlled switch 170 may be moved from the position illustrated in solid lines in FIG. 6A to the position illustrated in dashed lines so that indicator light 168 will only be illuminated upon generation of a disabling signal as opposed to the arrangement illustrated in FIG. 6A wherein the indicator light is illuminated in the absence of a disabling signal. It is now clear that a stop signal will be generated on line 154 whenever any one of the sensing means produces a disabling signal in response to the detection of an improper order or orientation of the corresponding piston ring. Indicator light 172 will normally be illuminated but will be extinguished upon generation of a disabling signal by any one of the sensing means circuits.

FIG. 6B is a circuit diagram of a control means 174 for preventing the ring assembly means 42 from operating in an assembling cycle in response to the generation of a stop signal by the detection means 76. In essence, control means 174 includes an expand relay 1CR and a relax relay 2CR for controlling respectively an expand solenoid operator 176 and a relax solenoid operator 178, respectively, to cause movement of jaws 62 and 64 between first and second positions through the operation of an actuator means which will be described more fully below. Power is supplied to control means 174 by power input lines L1 and L2. Expand relay 1CR is connected in series with normally closed contact 2CR and contact 180 across lines L1 and L2. Contact 180 forms part of a foot operated switch 182. When contact 180 is closed, expand relay 2CR is energized and remains energized by virtue of normally opened contact 184 which shunts the foot contact 180. A second contact 186 is connected in series with relay 2CR and is operated in conjunction with foot contact 180. Thus, opening of contact 180 causes 186 to close and vice versa. Closure of contact 186 does not, however, automatically energize relay solenoid 2CR. Such energization only occurs if triac 188 has received an appropriate gating signal on line 190 which is connected to output line 154 of the stop signal generating means 152 of FIG. 6A.

In the specific circuit arrangement illustrated in FIGS. 6A and 6B, the absence of a disabling signal from any one of the sensing means circuits will cause the normal input supplied by line 162 to appear on line 190 to place triac 188 in a conducting state. The same signal causes indicator light 172 to be illuminated. Whenever any one of the sensing means circuits produces a disabling signal, the gating signal will be removed from line 190 and will cause triac 188 to revert to a non-conducting state such that closure of contact 186 will fail to energize relay solenoid 2CR. Manual switch 192 may be operated to shunt triac 188 and cause the relay coil 2CR to be energized.

A proximity switch 194 is also connected in shunt around triac 188 and is normally closed except upon detection of the proper insertion of a piston within a set of expanded rings held by the ring supporting element 48. Proximity switch 194 is shown in FIGS. 2-4 and may be of the magnetic type or may be an electro-optic sensor similar to the type of electro-optic means employed in the sensing means of FIGS. 5 and 6A. If the proximity switch 194 fails to detect the presence of a properly located piston, the ring detection means 76 is effectively deactivated and will permit the rings to be relaxed upon removal of the operator's foot from switch 182. When a piston is properly positioned within a set of expanded rings, detector 194 will operate to open contact 196 thereby causing triac 188 to provide the only possible conductive path in series with relay coil 2CR across lines L1 and L2. When the control means 174 is in this condition, generation of a disabling signal by any one of the sensing means circuits will result in the removal of the gating signal from triac 188.

It is clear from FIG. 6B that energization of relay 1CR upon closure of contact 180 will cause the normally opened contacts 198 and 200 to close and energize the expand solenoid 176. Correspondingly, energization of relay coil 2CR will cause normally open contacts 202 and 204 to close and energize relax solenoid 178. Simultaneously with the energization of coil 2CR, normally closed contacts 205 will open to deenergize coil 1CR.

FIG. 6C discloses a power supply circuit including transformer 226, a rectifier 288 and filter 230 for supplying 12 volt DC voltage to the transistorized, detection means circuit 76 and to the light sources 118, 232, 234, 236 and 104 for the electro-optic means forming part of circuits 115, 136, 138, 140 and 142, respectively.

Figure 7:
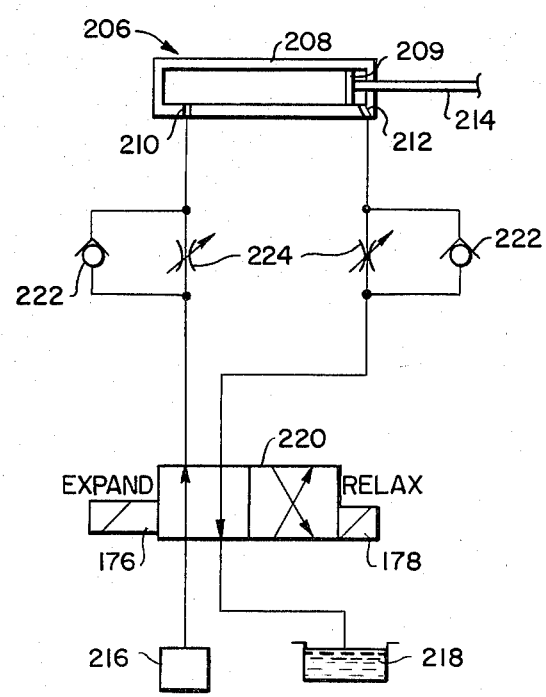
FIG. 7 is a schematic illustration of the actuator means for operating the pivoted jaws of the piston installation apparatus of FIGS. 2-4.

Turning now to FIG. 7, actuator means 206 is illustrated for responding to the energization of solenoids 176 or 178 to cause jaws 62 and 64 to move between their first and second positions. In particular, actuator means 206 includes hydraulic cylinder 208 within which a piston 209 is mounted for rectilinear movement responsive to fluid pressure supplied through ports 210 and 212 to move connector shaft 214 attached to piston 209 at one end and a spreading mechanism (not illustrated) for jaws 62 and 64 at the other end. Ports 210 and 212 are connected with a fluid supply source 216 and a sump 218, respectively, by means of a two way valve 220. Valve 220 assumes its position upon energization of relax solenoid 178. Alternatively, upon energization of expand solenoid 176, two way valve 220 will assume its alternate condition in which port 210 is caused to communicate with sump 218 and port 212 communicates with fluid source 216. The fluid lines connecting ports 210 and 212 with valve 220 each include a check valve 222 and restriction orifice 224 to control the speed of actuation of the piston 209 and to allow for unrestricted bleeding on the non-pressurized side of piston 209.

Figure 8:
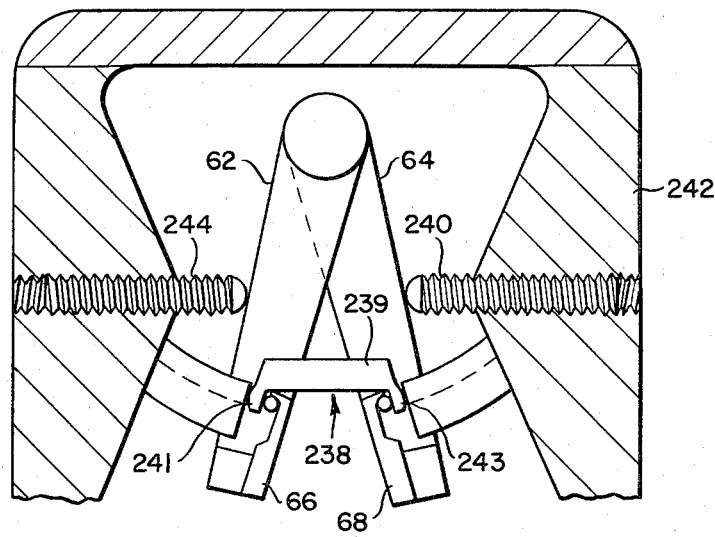
FIG. 8 is a cross-sectional view of the piston installation apparatus designed in accordance with the subject invention taken along lines 8—8 of FIG. 3.

Looking now to FIG. 8, the structure used to limit the movement of jaws 62 and 64 and to adjust the limits of movement is disclosed. In particular, a screw threaded stop 240 is provided in the housing 242 of the ring assembly means 42 in order to control the location of jaw 64 in its second position. Accordingly, adjustment of stop 240 will insure that the ring engaging element 68 is properly positioned relative to the position of optic fiber cable ends 84, 92 and 94 to allow sensing of the identifying markings placed on the peripheral surface of the corresponding bottom, middle and top piston rings. After jaw 64 is positioned by stop 240, gauge means 238 may be used to permit adjustment of the location of jaw 62 when in its second position to allow jaws 62 and 64 to be spread apart a sufficient amount without exceeding the expansion limits of the rings. Gauge means 238 includes a bar 239 and hook-like depending members 241 and 243 for engaging elements 66 and 68, respectively. A second adjustable stop 24 threaded to housing 242 is adjusted so as to contact jaw 62 when moved to the position determined by gauge means 238.

Numerous modifications and changes can be made within the scope of the invention disclosed above and still achieve the purpose of the subject invention. For example, other types of detecting means may be employed other than the electro-optic means described herein. The magnetic proximity detector may be replaced by an optic fiber detector and the detection means may be applied to other types of ring installing apparatus.

Industrial Application

The subject invention has particular utility in insuring the proper operation of piston ring installing apparatus for use in forming the piston assemblies for internal combustion engines. Numerous other applications of the disclosed concept exist wherever an article of manufacture is formed by the assembly of plural dissimilar components which must be properly ordered and/or oriented. The electro-optic features of this invention permit the order and orientation of respective components to be easily sensed dependent upon the inherent optical characteristics of the components or upon the type and position of optical identifying markings placed on the components.

I claim:

1. Apparatus for installing a set of dissimilar piston rings which must be arranged in a proper predetermined order or orientation in a plurality of corresponding grooves contained in the exterior surface of a piston, comprising
  (a) ring assembly means for operating in successive cycles including a holding cycle in which a set of piston rings are retained in the order in which the set will be installed and an assembling cycle in which the set of piston rings are installed in the grooves of a piston in the order in which the piston rings were retained during the immediately preceding holding cycle;
  (b) detection means for sensing the order or orientation in which the ring assembly means retains the set of piston rings during a holding cycle and for generating a stop signal if the rings are not in proper order or orientation; and
  (c) control means connected with said detection means for preventing said ring assembly means from operating in the assembling cycle in response to the generation of said stop signal by said detection means.

2. Apparatus as defined in claim 1, wherein said detection means includes plural order sensing means corresponding in number to the number of piston rings in each set, each said order sensing means producing an electrical disabling signal if the corresponding ring is not in its proper predetermined sequential order, said detection means including stop signal generating means for generating said stop signal whenever any one of said order sensing means produces a disabling signal.

3. Apparatus as defined in claim 2, wherein said detection means includes plural orientation sensing means corresponding in number to the number of piston rings capable of being reversed in orientation, each said orientation sensing means producing an electrical disabling signal if the corresponding piston ring is not in its proper orientation, said stop signal generating means operating to generate said stop signal whenever any one of said orientation sensing means produces a disabling signal.

4. Apparatus as defined in claim 3, wherein each said sensing means includes electro-optical means for responding to an optical property of a corresponding ring to produce said disabling signal.

5. Apparatus as defined in claim 4, wherein each said electro-optical means includes a light source, a photodetector, a first optic fiber extending between said light source and a desired position for a corresponding piston ring for directing a beam of light onto a piston ring and a second optic fiber extending between said desired position and said photodetector for directing a reflected portion of said beam of light to said photodetector indicative of the order and/or orientation of the corresponding ring.

6. Apparatus as defined in claim 1 for installing expandible split piston rings, wherein said ring assembly means includes ring supporting means for supporting a set of rings in relatively fixed coaxial positions in which the rings are axially spaced in accordance with the corresponding ring receiving grooves of a piston and in which the rings may be expanded to allow the piston to be moved axially through the expanded rings to cause the corresponding ring receiving grooves to radially align with the corresponding expanded piston rings and expanding means for engaging the split ends of each piston ring and for expanding the rings by separating the split ends sufficiently to allow the piston to pass through the coaxially positioned and expanded rings and further for relaxing the rings while being guided by said ring supporting means to cause the rings to be installed in the corresponding grooves of the piston.

7. Apparatus as defined by claim 6, wherein said ring supporting means includes a semicylindrical surface containing arcuate grooves shaped and positioned to retain the set of rings in their respective fixed co-axial positions when expanded and relaxed by said expanding means.

8. Apparatus as defined in claim 7, wherein said expanding means includes a pair of pivoted jaws for engaging respectively the split ends of each piston ring being held by said ring supporting means and for moving between a first position in which the rings are relaxed to a second position in which the rings are expanded sufficiently to permit co-axial movement of the piston therethrough and actuator means for moving said jaws between said first and second positions in response to a control signal, and wherein said control means includes switch means for causing said control means to generate said control signal in response to operator command except when said detection means produces said stop signal.

9. Apparatus as defined in claim 8, wherein said control means includes piston detection means for producing an enabling signal when a piston has been positioned within a set of expanded piston rings being held by said ring supporting means and for preventing said control means from generating a control signal which will cause said expanding means to relax an expanded set of rings being held by said ring supporting means in the absence of a piston being positioned within the set of expanded rings.

10. Apparatus as defined in claim 2 for installing dissimilar piston rings having optical identifying markings capable of uniquely identifying the dissimilar piston rings in each set, said order sensing means including photodetector means for responding to the optical identifying markings in a manner to identify the piston ring being sensed.

11. Apparatus as defined in claim 10, wherein said order sensing means responds to position differences in the optical identifying markings.

12. Apparatus as defined in claim 10, wherein said order sensing means responds to color differences in the optical identifying markings.

13. Apparatus as defined in claim 8, wherein said expanding means includes first stop means for defining the location of one of said jaws when moved to said second position to locate properly the piston rings for inspection by said detection means and second stop means for defining the position of the other said jaw when moved to said second position to limit the maximum possible expansion of the piston rings.

* * * * *